(12) United States Patent
Kokon

(10) Patent No.: US 9,291,118 B2
(45) Date of Patent: Mar. 22, 2016

(54) IDLE REDUCTION CONTROL DEVICE, VEHICLE, IDLE REDUCTION CONTROL METHOD, AND COMPUTER PROGRAM

(75) Inventor: Junya Kokon, Tokyo (JP)

(73) Assignee: HINO MOTORS, LTD., Tokyo (JP)

( * ) Notice: Subject to any disclaimer, the term of this patent is extended or adjusted under 35 U.S.C. 154(b) by 652 days.

(21) Appl. No.: 13/819,089

(22) PCT Filed: Oct. 20, 2011

(86) PCT No.: PCT/JP2011/074204
§ 371 (c)(1),
(2), (4) Date: Feb. 26, 2013

(87) PCT Pub. No.: WO2012/053613
PCT Pub. Date: Apr. 26, 2012

(65) Prior Publication Data
US 2013/0158843 A1  Jun. 20, 2013

(30) Foreign Application Priority Data
Oct. 21, 2010 (JP) .................. 2010-236606

(51) Int. Cl.
*F02D 45/00* (2006.01)
*F02D 29/02* (2006.01)
(Continued)

(52) U.S. Cl.
CPC . *F02D 45/00* (2013.01); *B60K 6/48* (2013.01); *B60W 10/06* (2013.01); *B60W 30/18018* (2013.01); *F02D 29/02* (2013.01);
(Continued)

(58) Field of Classification Search
CPC .............. Y02T 10/48; Y02T 10/6221; B60W 30/18018; B60W 30/18118; B60W 10/06; B60W 2710/065; B60W 2540/16; B60W 2540/06; B60W 2520/04; B60W 2510/101; F02D 45/00; B60K 6/48; Y10S 903/902
See application file for complete search history.

(56) References Cited

U.S. PATENT DOCUMENTS 5,653,659 A * 8/1997 Kunibe et al. .................. 477/111
6,275,759 B1   8/2001 Nakajima et al.
(Continued)

FOREIGN PATENT DOCUMENTS

DE  102004024212 A1  12/2005
GB  2413999 A   11/2005
(Continued)

OTHER PUBLICATIONS

International Search Report of the corresponding International Application, PCT/JP2011/074204 dated Feb. 7, 2012.
(Continued)

*Primary Examiner* — Hieu T Vo
*Assistant Examiner* — Sherman Manley
(74) *Attorney, Agent, or Firm* — Cowan, Liebowitz & Latman, P.C.; Mark Montague

(57) ABSTRACT

A vehicle can reverse immediately after setting a no idling state in accordance with a simple operational procedure. An idle reduction control unit set the engine into a no idling state if the key switch is on, the brake is operated, the vehicle speed is zero, and the shift position is in the drive range; and restarts the engine if the braking operation is released and the shift position is in the drive range when the engine is in the no idling state. The idle reduction control unit also restarts the engine if the shift position is shifted from the drive range to the neutral range while the brake is still being operated when the engine is in the no idling state.

8 Claims, 13 Drawing Sheets

(51) Int. Cl.
   *B60K 6/48* (2007.10)
   *B60W 10/06* (2006.01)
   *B60W 30/18* (2012.01)

(52) U.S. Cl.
   CPC ...... *B60W2510/101* (2013.01); *B60W 2520/04* (2013.01); *B60W 2540/06* (2013.01); *B60W 2540/12* (2013.01); *B60W 2540/16* (2013.01); *B60W 2710/065* (2013.01); *Y02T 10/48* (2013.01); *Y02T 10/6221* (2013.01); *Y10S 903/902* (2013.01)

(56) References Cited

U.S. PATENT DOCUMENTS

| | | | |
|---|---|---|---|
| 6,371,889 B1 * | 4/2002 | Kuroda et al. | 477/181 |
| 8,157,705 B2 * | 4/2012 | Yu et al. | 477/200 |
| 8,702,563 B1 * | 4/2014 | Sangameswaran et al. | 477/111 |
| 9,056,606 B1 * | 6/2015 | Rademacher et al. | |
| 2001/0013701 A1 | 8/2001 | Onoyama et al. | |
| 2005/0067200 A1 | 3/2005 | Jiang et al. | |
| 2012/0196723 A1 * | 8/2012 | Christen et al. | 477/167 |

FOREIGN PATENT DOCUMENTS

| | | |
|---|---|---|
| JP | 2005-132147 A | 5/2005 |
| JP | 2006-234013 A | 9/2006 |
| JP | 2010-127197 A | 6/2010 |

OTHER PUBLICATIONS

Office Action of the corresponding CN 201180040645.2 application; dated Jan. 6, 2015, with an English Translation.

* cited by examiner

IDLE REDUCTION CONTROL DEVICE, VEHICLE, IDLE REDUCTION CONTROL METHOD, AND COMPUTER PROGRAM

CROSS REFERENCE TO RELATED APPLICATIONS

This is a U.S. national stage of application No. PCT/JP2011/074204, filed on Oct. 20, 2011. Priority under 35 U.S.C. §119(a) and 35 U.S.C. §365(b) is claimed from Japanese Patent Application No. 2010-236606 filed on Oct. 21, 2010, the disclosure of which is also incorporated herein by reference.

TECHNICAL FIELD

The present invention relates to an idle reduction control device, a vehicle, an idle reduction method, and a computer program.

BACKGROUND ART

Idle reduction which temporarily stops an engine in an idling state when a vehicle temporarily stops due to a signal and the like with a view to reducing exhaust gas and improving fuel efficiency has been spread. In controlling the idle reduction, when a brake is operated and a vehicle speed is thus removed, the engine is controlled to automatically stop.

Meanwhile, in the idle reduction, when the operation of the brake is released, the engine that temporarily stopped automatically restarts and returns to a drivable state (see, for example, Patent Literature 1). The release of the brake includes a state in which pressure at which a driver steps a brake pedal is decreased up to predetermined pressure in addition to a case in which a driver's foot is completely separated from the brake pedal.

CITATION LIST

Patent Literature

PTL1: JP 3613970 B

SUMMARY OF INVENTION

Technical Problem

In the idle reduction control in the conventional art, it is a condition that the operation of the brake is released in restarting the engine. Therefore, for example, when a driver intends to reverse just after the engine restarted from the no idling state, the driver needs once to take his/her foot off the brake pedal and restart the engine and thereafter, set a gear position to a reverse stage (R).

As such, in the vehicle that performs the idle reduction control in the conventional art, since the condition of restarting the engine is the release of the brake, a sequence of restarting the engine while the operation of the brake is released is required for the vehicle to reverse just after the engine restarts from the no idling state. In this case, when the vehicle stops on a hill, since releasing the operation of the brake in order to restart the engine may be dangerous, the driver is forced to perform a difficult operation.

The present invention has been made under this background, and an object of the present invention is to provide an idle reduction control device, a vehicle, an idle reduction control method, and a program that allows the vehicle to reverse just after an engine restarts from a no idling state by a simple and safe operating sequence.

Solution to Problem

An aspect of the present invention is directed to an idle reduction control device. In the idle reduction control device, an engine is set to a no idling state when a key switch is in an ON state, a brake is operated, thus a vehicle speed is zero and a shift position is in a drive range, and the engine is restarted when an operation of the brake is released while the engine is in the no idling state and the shift position is in the drive range, wherein the engine is restarted when the shift position is transferred from the drive range to a neutral range while the brake is still being operated when the engine is in the no idling state.

Further in the idle reduction control device according to the aspect of the invention, prior to executing idle reduction in a vehicle having a hill start assisting device holding braking force even though a driver releases the operation of the brake when stopping on an ascending slope, when the hill start assisting device is in an off state, the hill start assisting device may be forcibly turned on.

Another aspect of the present invention is directed to a vehicle. The vehicle has the idle reduction control device according the present invention, wherein the idle reduction control device is started with the start of the vehicle, and the vehicle has a switch that alternately repeats pause and restart of the idle reduction control device whenever the brake is operated.

In the vehicle according to the other aspect of the present invention, when the brake is operated at a strength of a predetermined value or more, a gear position may be set to a neutral stage and provided in the idle reduction and when the brake is operated at a strength less than a predetermined value, the gear position may be set to a start stage.

In the vehicle according to the other aspect of the present invention, when an engine is set to an idle reduction, a rotational shaft of the engine may be connected to a rotational shaft of an electric motor controlled to hold zero rotation.

The vehicle according to the other aspect of the present invention further includes an engine and an electric motor, wherein a hybrid vehicle is driven by an engine or an electric motor, or cooperation of the engine and the electric motor.

Still another aspect of the present invention is directed to an idle reduction control method for an idle reduction control device. In the idle reduction control method for an idle reduction control device, an engine is set to a no idling state when a key switch is in an ON state, a brake is operated, thus a vehicle speed is zero and a shift position is in a drive range, and the engine is restarted when an operation of the brake is released while the engine is in the no idling state and the shift position is in the drive range, wherein the engine is restarted when the shift position is transferred from the drive range to a neutral range while the brake is still being operated when the engine is in the no idling state.

Still another aspect of the present invention is directed to a program. The program causes an information processing device to execute a function of the idle reduction control device according the present invention.

Advantageous Effects of Invention

According to the present invention, the vehicle can reverse just after the engine restarts from the no idling state by the simple and safe operating sequence.

DESCRIPTION OF EMBODIMENTS (Preamble)

An object of an idle reduction control is to reduce exhaust gas and improve fuel efficiency thereby, and this is common to an object of a hybrid vehicle. Accordingly, it is useful for further reducing the exhaust gas and improving the fuel efficiency to apply the idle reduction control to the hybrid vehicle. Therefore, an example of applying the idle reduction control to the hybrid vehicle will be hereinafter described. However, the application of the idle reduction control according to an embodiment of the present invention is not limited to the hybrid vehicle.

First Embodiment

Hereinafter, a hybrid vehicle according to a first embodiment of the present invention will be described with reference to FIGS. 1 to 4.

Figure 1:
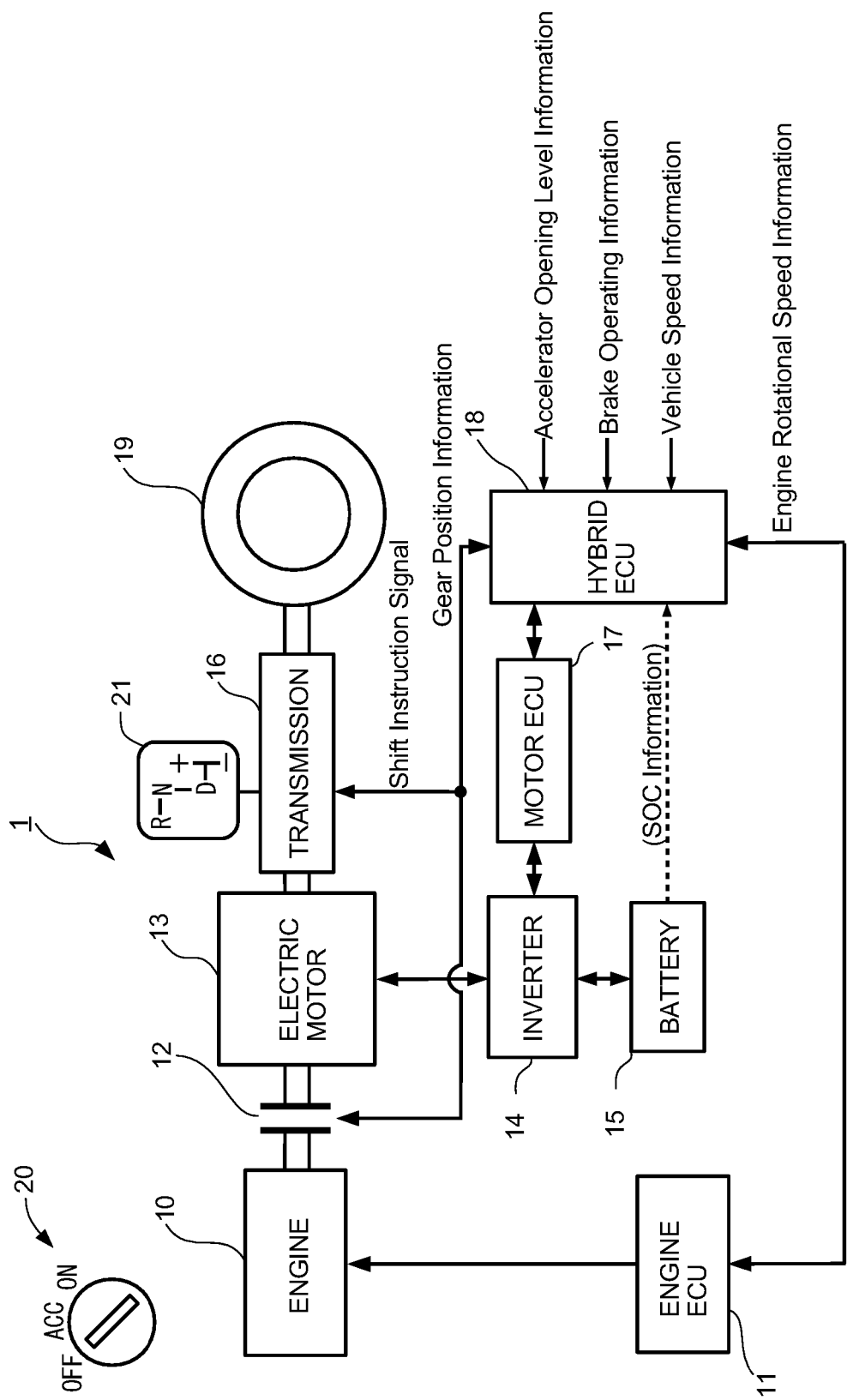
FIG. 1 is a block diagram illustrating an example of a structure of a hybrid vehicle according to a first embodiment.

FIG. 1 is a block diagram illustrating an example of a structure of a hybrid vehicle 1. The hybrid vehicle 1 is one example of a vehicle. The hybrid vehicle 1 is driven by an engine (internal combustion engine) 10 and/or an electric motor 13 through a gear shift of a semi-automatic transmission and is capable of performing idle reduction at the time of temporary stop such as waiting at a red light. Note that the semi-automatic transmission is a transmission that can automatically perform a shifting operation with the same structure as a manual transmission.

The hybrid vehicle 1 includes an engine 10, an engine ECU (electronic control section) 11, a clutch 12, an electric motor 13, an inverter 14, a battery 15, a transmission 16, a motor ECU 17, a hybrid ECU 18, a vehicle wheel 19, a temporary stop switch 20, and a shift unit 21. Note that the transmission 16 has the aforementioned semi-automatic transmission and is operated by the shift unit 21 having a drive range (hereinafter, referred to as a D (drive) range).

The engine 10 as one example of the internal combustion engine is controlled by the engine ECU 11, generates motive power to rotate a shaft by combusting gasoline, gas oil, CNG (compressed natural gas), LPG (liquefied petroleum gas), or alternative fuel therein and transfers the generated motive power to the clutch 12.

The engine ECU 11 is a computer which operates in conjunction with the motor ECU 17 by following an instruction from the hybrid ECU 18 and controls the engine 10 such as a fuel injection amount or a valve timing. For example, the engine ECU 11 includes a CPU (central processing unit), an ASIC (application specific integrated circuit), a microprocessor (microcomputer), a DSP (digital signal processor), and the like, and has a computing unit, a memory, and an I/O (input/output) port, and the like therein.

The clutch 12 is controlled by the hybrid ECU 18 and transfers a shaft output from the engine 10 to the vehicle wheel 19 through the electric motor 13 and the transmission 16. In other words, the clutch 12 mechanically connects a rotational shaft of the engine 10 and a rotational shaft of the electric motor 13 to each other to transfer the shaft output of the engine 10 to the electric motor 13 or breaks the mechanical connection of the rotational shaft of the engine 10 and the rotational shaft of the electric motor 13 to allow the shaft of the engine 10 and the rotational shaft of the electric motor 13 to rotate at different rotational velocities, by the control of the hybrid ECU 18.

For example, the clutch 12 mechanically connects the rotational shaft of the engine 10 and the rotational shaft of the electric motor 13 to each other when the hybrid vehicle 1 is driven by the motive power of the engine 10, and as a result, power is generated in the electric motor 13, when the engine 10 is assisted by driving force of the electric motor 13, and when the engine 10 is started by the electric motor 13.

Further, for example, the clutch 12 breaks the mechanical connection of the rotational shaft of the engine 10 and the rotational shaft of the electric motor 13 when the engine 10 is in a stop or idling state, and the hybrid vehicle 1 is driven by the driving force of the electric motor 13, and when the engine 10 is in the stop or idling state, the hybrid vehicle 1 is decelerated or is driven on a downhill grade, and the electric motor 13 generates power (electric power is regenerated).

Note that the clutch 12 differs from a clutch operated by the driver's operation of a clutch pedal, and is operated by the control of the hybrid ECU 18.

The electric motor 13, which is a so-called a motor generator, generates the motive power to rotate the shaft by electric power supplied from the inverter 14 to supply the shaft output to the transmission 16 or is power-generated by the motive power to rotate the shaft, which is supplied from the transmission 16, and supplies the electric power to the inverter 14. For example, when the hybrid vehicle 1 gains the speed or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or the hybrid vehicle 1 runs with no power, such as the hybrid vehicle 1 is decelerated or is driven on the downhill grade. In that case, electric power is generated by the power for rotating the shaft supplied from the transmission 16 and is supplied to the inverter 14 in order to charge the battery 15.

The inverter 14 is controlled by the motor ECU 17, and converts DC voltage from the battery 15 into AC voltage or converts AC voltage from the electric motor 13 into DC voltage. When the electric motor 13 generates motive power, the inverter 14 converts the DC voltage of the battery 15 into the AC voltage to supply electric power to the electric motor 13. When the electric motor 13 generates power, the inverter 14 converts the AC voltage from the electric motor 13 into the DC voltage. In other words, in this case, the inverter 14 serves as a rectifier for supplying the DC voltage to the battery 15 and a voltage adjusting device.

The battery 15, which is a chargeable and dischargeable secondary battery, supplies the electric power to the electric motor 13 through the inverter 14 when the electric motor 13 generates the motive power or is charged by the electric power generated by the electric motor 13 when the electric motor 13 generates electric power.

The transmission 16 has a semi-automatic transmission (not illustrated in the drawings) that selects any one of a plurality of gear ratios (shift ratios) according to a shift instruction signal from the hybrid ECU 18, and transfers the motive power of the shifted engine 10 and/or the motive power of the electric motor 13 to the vehicle wheel 19 by switching the shift ratio. Further, when the hybrid vehicle is decelerated or is driven on the downhill grade, the transmission 16 transfers motive power from the vehicle wheel 19 to the electric motor 13. In the semi-automatic transmission, a driver may operate the shift unit 21 to manually change a gear position to a predetermined gear stage.

The motor ECU 17 is the computer which operates in conjunction with the engine ECU 11 by following an instruction from the hybrid ECU 18 and controls the inverter 14 to control the electric motor 13. For example, the motor ECU 17 includes a CPU, an ASIC, a microprocessor (microcomputer), a DSP, and the like and has a computing unit, a memory, an I/O port, and the like therein.

The hybrid ECU 18 is one example of the computer, and acquires accelerator opening level information, brake operation information, vehicle speed information, and gear position information acquired from the transmission 16, and engine rotational speed information acquired from the engine ECU 11 to control the clutch 12 by referring to the information and controls the semi-automatic transmission of the transmission 16 by supplying a shift instruction signal, for hybrid driving. The hybrid ECU 18 gives a control command of the electric motor 13 and the inverter 14 to the motor ECU 17 based on the acquired SOC information of the battery 15 and other information, and gives a control command of the engine 10 to the engine ECU 11, for hybrid driving. For example, the hybrid ECU 18 includes a CPU, an ASIC, a microprocessor (microcomputer), a DSP, and the like and has a computing unit, a memory, an I/O port, and the like therein.

Note that a program executed by the hybrid ECU 18 is prestored in a nonvolatile memory in the hybrid ECU 18 to be installed in the hybrid ECU 18 as the computer in advance.

The engine ECU 11, the motor ECU 17, and the hybrid ECU 18 are connected to each other by a bus based on a standard such as a CAN (control area network), and the like.

The vehicle wheel 19 is a driving wheel that transfers driving force to the road surface. Note that, in FIG. 1, only one vehicle wheel 19 is illustrated, but the hybrid vehicle 1 actually has a plurality of vehicle wheels 19.

A key switch 20 is, for example, a switch which is turned on/off with a key put by a user when the user starts driving, and as the key switch 20 is turned on, each unit of the hybrid vehicle 1 starts and as the key switch 20 is turned off, each unit of the hybrid vehicle 1 stops.

Figure 2:
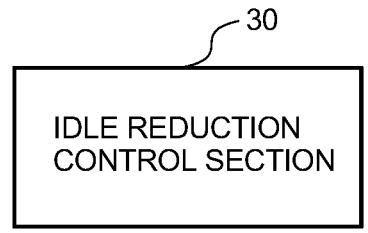
FIG. 2 is a block diagram illustrating an example of a configuration of a function implemented in a hybrid ECU of FIG. 1.

FIG. 2 is a block diagram illustrating an example of a configuration of a function implemented in the hybrid ECU 18 that executes the program. That is, when the hybrid ECU 18 executes the programs, an idle reduction control unit 30 is implemented. The idle reduction control unit 30 serves to control the idle reduction.

Subsequently, processing of the idle reduction control performed by the hybrid ECU 18 that executes the program will be described with reference to flowcharts of FIGS. 3 and 4. The processing in the flowcharts in FIGS. 3 and 4 is for one cycle and is repeatedly executed when the key switch 20 of the hybrid vehicle 1 is in an ON state.

Figure 3:
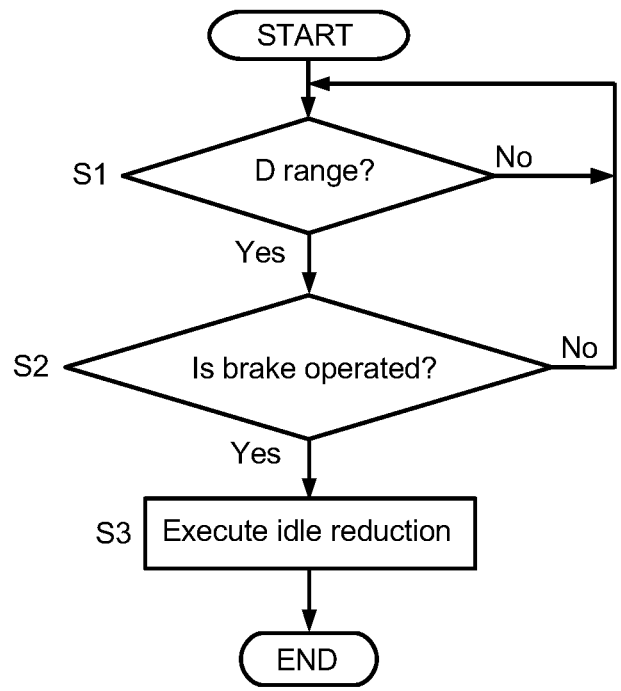
FIG. 3 is a flowchart illustrating idle reduction processing of an idle reduction control unit of FIG. 2.
Figure 4:
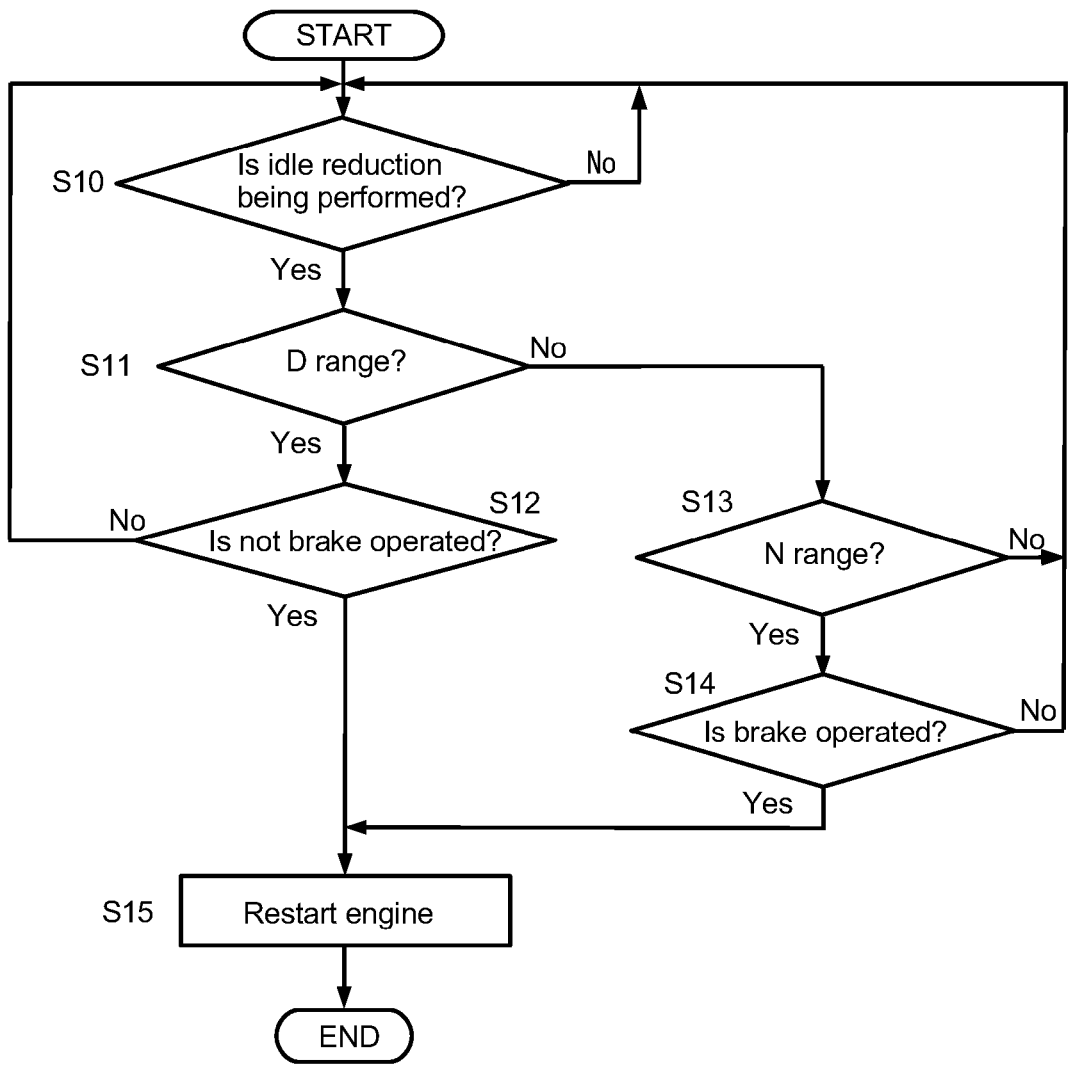
FIG. 4 is a flowchart illustrating engine restart processing from a no idling state of the idle reduction control unit of FIG. 2.

The flowchart of FIG. 3 illustrates the processing of the idle reduction performing control. In START, the key switch 20 of the hybrid vehicle 1 is in the ON state, the hybrid ECU 18 executes the program, the function of the idle reduction control unit 30 is implemented in the hybrid ECU 18, and the process proceeds to step S1. Before START, the hybrid vehicle 1 has a driving history at a predetermined vehicle speed or more (for example, 5 km/h or more).

When the idle reduction is performed, the idle reduction control unit 30 determines whether the shift position is in the D range in step S1 as illustrated in FIG. 3. In step S1, when it is determined that the shift position is in the D range, the process proceeds to step S2. On the other hand, in step S1, when it is determined that the shift position is not in the D range, the process repeats step S1.

In step S2, the idle reduction control unit 30 determines whether the brake is operated. In step S2, when it is determined that the brake is operated, the process proceeds to step S3. Herein, the 'brake is operated' means that liquid pressure (hereinafter, referred to as brake liquid pressure) of brake oil is increased by the driver's stepping of the brake pedal and is a predetermined value or more (alternately, more than a predetermined value). On the other hand, in step S2, when it is determined that the brake is not operated, the process returns to step S1. Herein, 'brake is not operated' means that the brake liquid pressure is decreased by the driver's opening of the brake pedal or decreasing step force, and is less than a predetermined value (alternately, a predetermined or less).

In step S3, the idle reduction control unit 30 terminates processing after performing the idle reduction control. In detail, the idle reduction control unit 30 commands the engine ECU 11 to stop the engine 10. When the engine 10 stops, a rotational shaft of the engine 10 and a rotational shaft of the electric motor 13 are connected with each other through the clutch 12 and rotation of the engine 10 is controlled to stop in a short time by friction of the electric motor 13. As such, when the engine 10 and the electric motor 13 are connected to each other in order to stop the engine 10, the idle reduction control unit 30 commands the motor ECU 17 in addition to the engine ECU 11 to control the clutch 12.

Subsequently, processing of restarting the engine 10 from the no idling state will be described with reference to FIG. 4. In START of FIG. 4, the key switch 20 of the hybrid vehicle 1 is in the ON state and the vehicle is under a stoppage. The idle reduction control unit 30 is implemented in the hybrid ECU 18.

As illustrated in FIG. 4, in step S10, the idle reduction control unit 30 determines whether the vehicle is under the idle reduction at present and when the vehicle is under the idle reduction, the process proceeds to step S11. On the other hand, in step S10, when the vehicle is not under the idle reduction, the process repeats step S10. Note that 'the vehicle is under the idle reduction' denotes that the hybrid vehicle 1 is under the stoppage by the processing illustrated in the flowchart of FIG. 3.

In step S11, the idle reduction control unit 30 determines whether a current shift position is in the D range. When the current shift position is in the D range, the process proceeds to step S12. And, when the current shift position is not in the D range, the process proceeds to step S13.

In step S12, the idle reduction control unit 30 determines whether the brake is operated and when the brake is not operated, the process proceeds to step S15. On the other hand, in step S12, when the brake is operated, the process returns to step S10.

In step S13, the idle reduction control unit 30 determines whether a current shift position is in a neutral range (hereinafter, referred to as an N (neutral) range) and when the current shift position is in the N range, the process proceeds to step S14. On the other hand, when the current shift position is not in the N range, the process returns to step S10.

In step S14, the idle reduction control unit 30 determines whether the brake is operated and when the brake is operated, the process proceeds to step S15. On the other hand, in step S14, when the brake is not operated, the process returns to step S10.

In step S15, the idle reduction control unit 30 terminates the processing for one cycle after restarting the engine 10.

(In Regard to Effects)

According to the hybrid vehicle 1, the conditions for restarting the engine 10 from the no idling state include 2) 'under the idle reduction', 'N range', and 'brake operated' in addition to (1) 'under the idle reduction', 'D range', and 'brake not operated'.

In the case where the conditions for restart include only the conditions of (1), when the driver intends to reverse the vehicle just after restarting the engine 10 from the no idling state, the brake needs to be stepped and the shift position needs to be operated up to a reverse position (R range) from the D range through the N range after restarting the engine 10 (step S15) without operating the brake (step S12) while the shift position is in the D range. Such operation is very cumbersome to the driver. In particular, since the condition for restart needs to be the state of 'brake not operated', the hybrid vehicle 1 may start to move along a hill when the hybrid vehicle 1 stops on the hill, which is very dangerous. The same applies even to a vehicle in the conventional art (for example, a vehicle of Patent Literature 1), which performs the idle reduction in the N range.

In this regard, by setting the condition of (2) as the additional condition for restart, when the driver intends to reverse the vehicle after restarting the engine 10 from the no idling state, the driver may restart the engine 10 only by setting the shift position to the N range from the D range while the state of 'brake operated' is continued. Thereafter, the driver operates the shift position to the reverse position (R range) from the N range and then may open the brake pedal at last. Such operation is very simple and safe to the driver.

As such, the hybrid vehicle 1 may reverse just after the engine 10 is restarted from the no idling state according to a simple and safe operating sequence.

Second Embodiment

Figure 5:
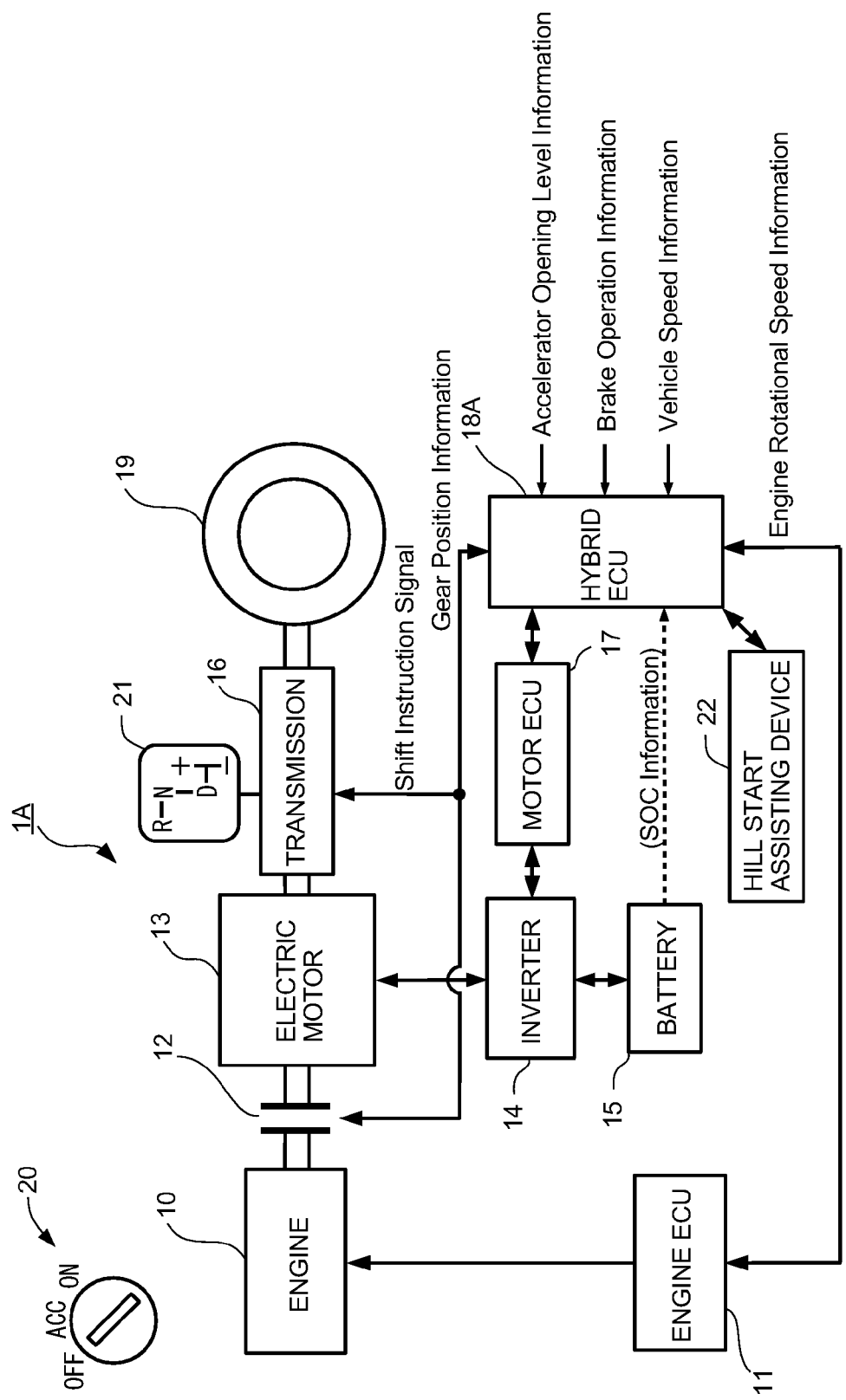
FIG. 5 is a block diagram illustrating an example of a structure of a hybrid vehicle according to a second embodiment.

A hybrid vehicle 1A according to a second embodiment of the present invention will be described with reference to FIGS. 5 and 6. As illustrated in FIG. 5, the hybrid vehicle 1A has a structure in which a hill start assisting device 22 is added to the hybrid vehicle 1 and will be described by using reference numerals (for example, the hybrid ECU 18A, the idle reduction control unit 30A, and the like) of the same system. The hill start assisting device 22 is a device disclosed in, for example, JP 6-8808 A, and is a device that holds braking force although the driver stops or weakens the operation of the brake when the hybrid vehicle 1A stops on the hill.

In the hybrid vehicle 1A, when the hybrid ECU 18A executes a program, a function of an idle reduction control unit 30A (not illustrated in the drawings) is implemented. The idle reduction control unit 30A forcibly starts the hill start assisting device 22 prior to performing the idle reduction.

Figure 6:
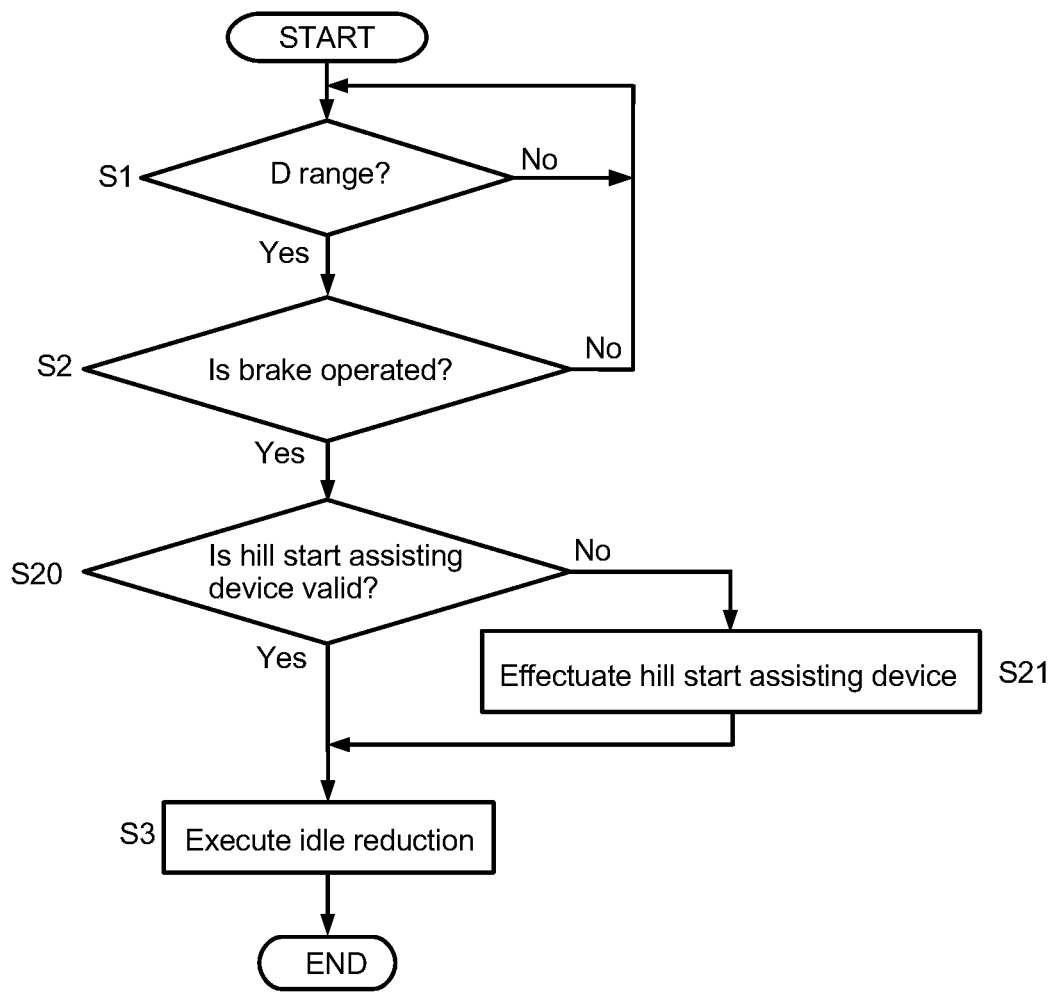
FIG. 6 is a flowchart illustrating idle reduction processing of an idle reduction control unit according to the second embodiment.

In a flowchart of FIG. 6, steps S20 and S21 are added to the flowchart of FIG. 3. Hereinafter, a description of the process which overlaps with the flowchart of FIG. 3 will be omitted. That is, in step S2, the idle reduction control unit 30A determines whether the brake is operated. In step S2, when it is determined that the brake is operated, the process proceeds to step S20. On the other hand, in step S2, when it is determined that the brake is not operated, the process returns to step S1.

In step S20, the idle reduction control unit 30A determines whether the hill start assisting device 22 is valid. In step S20, when it is determined that the hill start assisting device 21 is valid, the process proceeds to step S3. On the other hand, in step S20, when it is determined that the hill start assisting device 22 is not valid, the process proceeds to step S21.

In step S21, the idle reduction control unit 30A makes the hill start assisting device 22 be valid, and as a result, the process proceeds to step S3.

Other processes are the same as those described in FIG. 3.

(In Regard to Effects)

In the conventional art, when the hill start assisting device 22 is not valid, the idle reduction control is not performed. The reason will be described below.

When the engine 10 of the hybrid vehicle 1A is stopped, the clutch 12 is connected and the engine 10 is stopped by regenerative torque of the electric motor 13. As a result, a time until the engine 10 actually stops after the idle reduction control unit 30 commands execution of the idle reduction may be made short.

In this case, a little processing time (for example, for 1.5 seconds) is required to synchronize a rotational speed of the electric motor 13 with a rotational speed of the engine 10 at the time of connecting the clutch 12. During the processing, a gear position is in the neutral range, and as a result, when the hill start assisting device 22 is not valid under a situation in which the hybrid vehicle 1A is on the hill, the hybrid vehicle 1A may start to move along the hill. Therefore, the hill start assisting device 22 needs to be valid without fail. Therefore, in the conventional art, when the hill start assisting device 22 is not valid, the idle reduction control is not performed.

On the contrary, according to the hybrid vehicle 1A, when the hill start assisting device 22 is not valid, the hill start assisting device 22 may be made to be forcibly valid. As a result, a situation in which the idle reduction may not be performed as in the conventional art may be removed.

Third Embodiment

Figure 7:
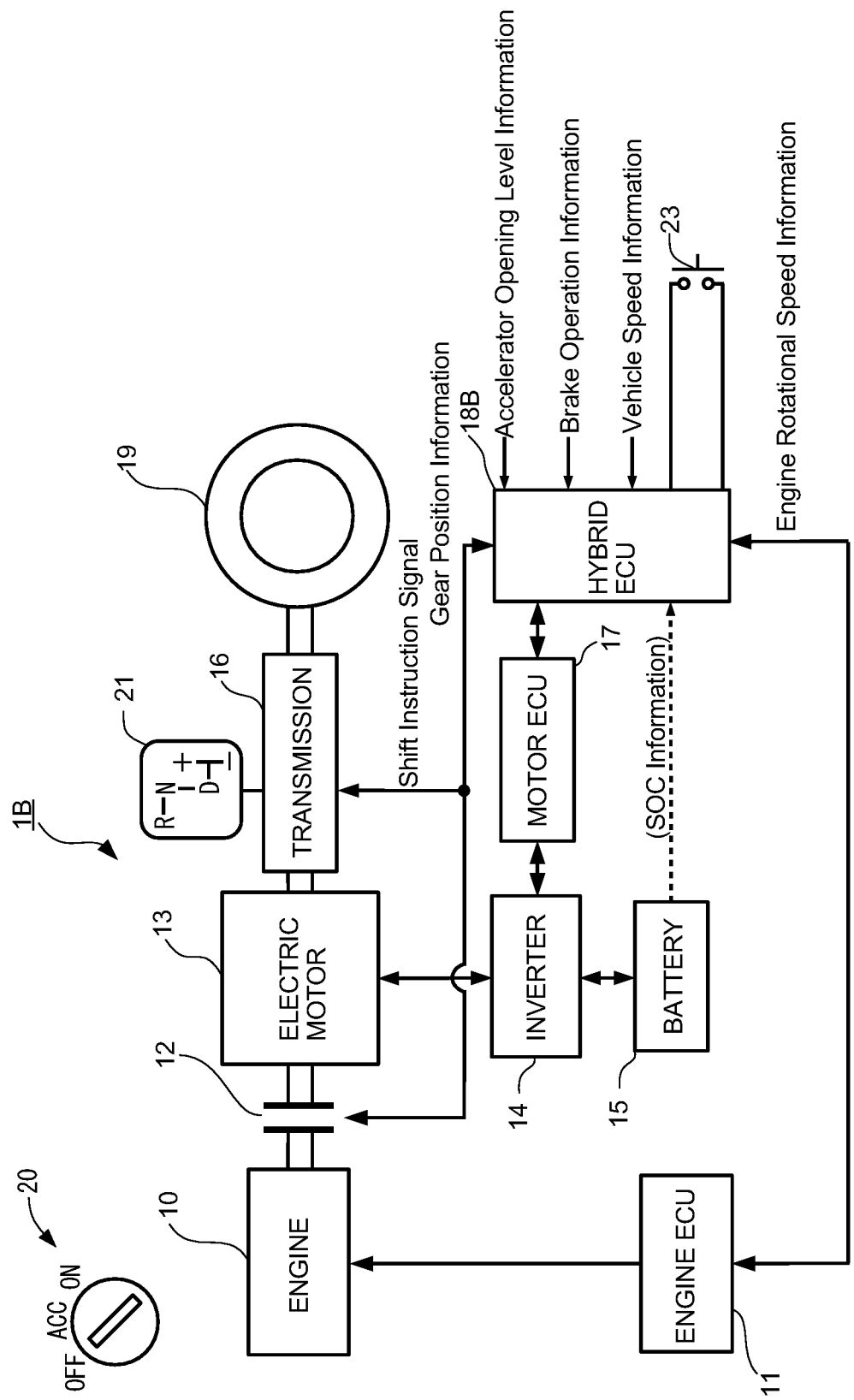
FIG. 7 is a block diagram illustrating an example of a structure of a hybrid vehicle according to a third embodiment.

A hybrid vehicle 1B according to a third embodiment of the present invention will be described with reference to FIGS. 7 to 9. As illustrated in FIG. 7, the hybrid vehicle 1B has a structure in which a pause switch 23 is added to the hybrid vehicle 1 and will be described by using reference numerals (for example, the hybrid ECU 18B, the idle reduction control unit 30B, and the like) of the same system. The pause switch 23 is a so-called momentary switch and is a switch configured so that contacts are conducted to each other only while an operator such as a driver presses a button part of the pause switch 23.

In the hybrid vehicle 1B, the idle reduction control unit 30B (not illustrated in the drawings) may alternately repeat pause and restart of the idle reduction function by inputting an operation of the pause switch 23 connected to the hybrid ECU 18B. This state is illustrated in a timing chart of FIG. 8. The pause switch 23 is the momentary switch that is conducted only while the driver presses a push button (not illustrated in the drawings).

Figure 8:
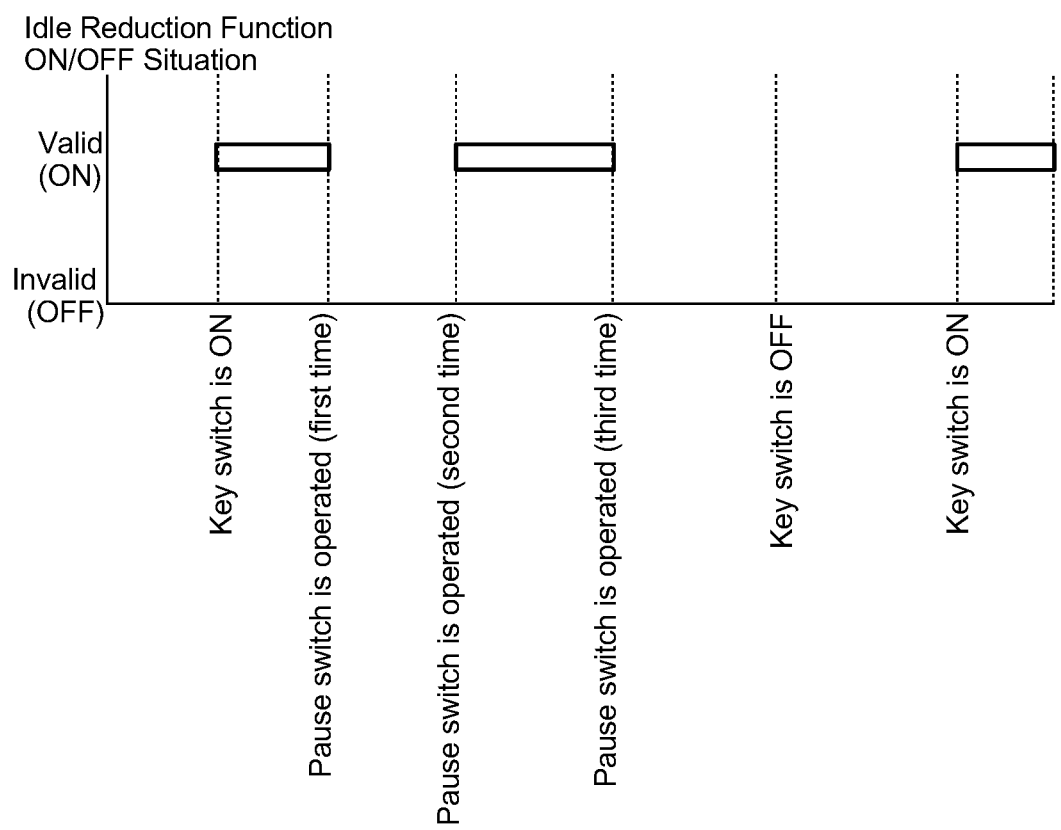
FIG. 8 is a timing chart illustrating an ON/OFF situation of an idle reduction function according to the third embodiment.
Figure 9:
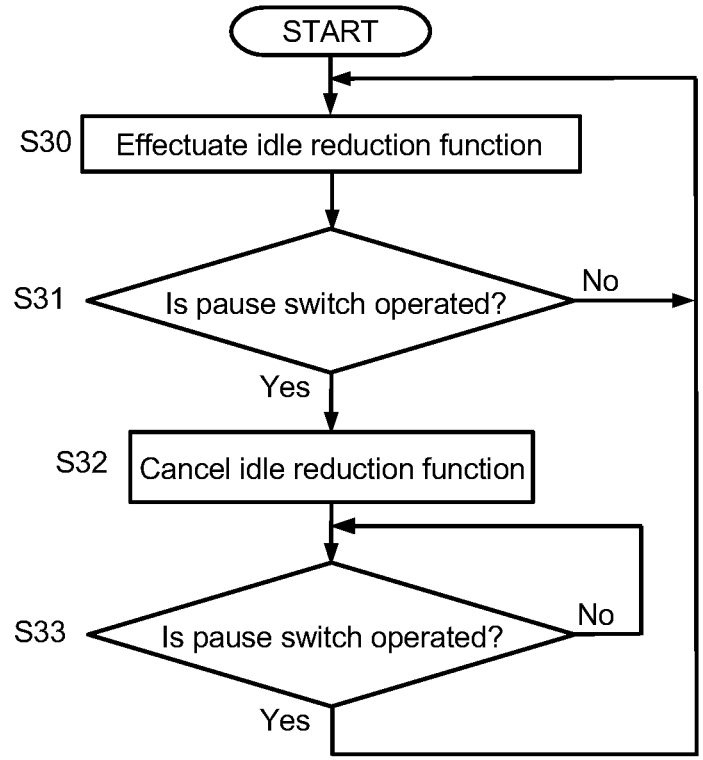
FIG. 9 is a flowchart illustrating ON/OFF processing of the idle reduction function of an idle reduction control unit according to the third embodiment.

As illustrated in FIG. 8, when the key switch 20 of the hybrid vehicle 1B is turned on, the idle reduction control unit 30B turns the idle reduction function on. Thereafter, as the key switch 20 is hold in the ON state, when the pause switch 23 is operated (at the first time), the idle reduction control unit 30B turns the idle reduction function OFF. Thereafter, when the pause switch 23 is operated (at the second time), the idle reduction control unit 30B effectuates the idle reduction function again. Thereafter, when the pause switch 23 is operated (at the third time), the idle reduction control unit 30B cancels the idle reduction function. When the key switch 20 is turned off in this state, the idle reduction control unit 30B itself stops. Subsequently, when the key switch 20 is turned on, the idle reduction control unit 30B effectuates the idle reduction function.

The above processing will be described in a flowchart of FIG. 9. In START, the key switch 20 of the hybrid vehicle 1B is in the ON state, the function of the idle reduction control unit 30B is implemented in the hybrid ECU 18B, and the process proceeds to step S30.

In step S30, the idle reduction control unit 30B effectuates the idle reduction function, and as a result, the process proceeds to step S31.

In step S31, the idle reduction control unit 30B determines whether the pause switch 23 is operated. In step S31, when it is determined that the pause switch 23 is operated, the process proceeds to step S32. On the other hand, in step S31, when it is determined that the pause switch 23 is not operated, the process returns to step S30.

In step S32, the idle reduction control unit 30B cancels the idle reduction function, and as a result, the process proceeds to step S33.

In step S33, the idle reduction control unit 30B determines whether the pause switch 23 is operated. In step S33, when it is determined that the pause switch 23 is operated, the process returns to step S30. On the other hand, in step S33, when it is determined that the pause switch 23 is not operated, the process repeats step S33.

In each step, when the key switch 20 is turned off, the idle reduction control unit 30B itself stops, and as a result, the processing ends.

(In Regard to Effects)

According to the hybrid vehicle 1B, the driver may temporarily stop or restart the idle reduction function by operating the pause switch 23. As a result, the ON/OFF state of the idle reduction function may be set according to a driver's demand.

Even when driving of the hybrid vehicle 1B ends by turning the key switch 20 OFF while the driver stops the idle reduction function, the idle reduction function is effectuated by subsequently turning the key switch 20 ON. That is, the idle reduction function is effectuated without fail at the time of starting the driving of the hybrid vehicle 1B. Accordingly, it is possible to avoid the hybrid vehicle 1B from being driven for a long time while the driver leaves the idle reduction function canceled. As a result, a chance in which the idle reduction function, which is useful to reduce exhaust gas and improve fuel efficiency, is effectively used may be increased.

Fourth Embodiment

Figure 10:
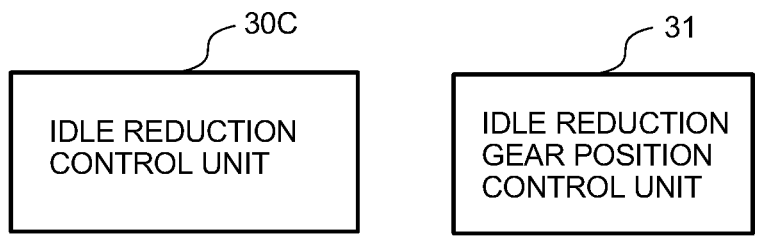
FIG. 10 is a block diagram illustrating an example of a configuration of a function implemented in a hybrid ECU according to a fourth embodiment.
Figure 11:
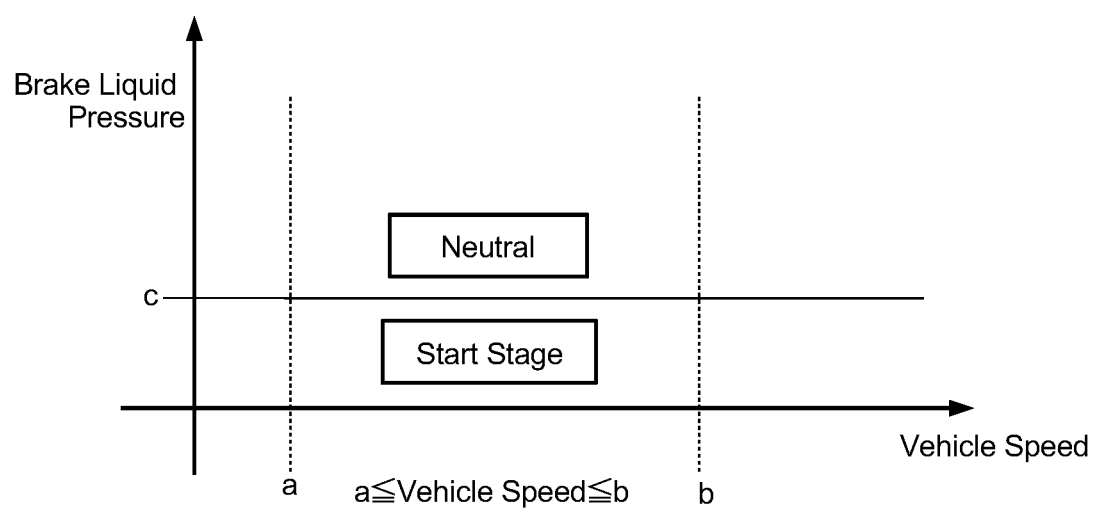
FIG. 11 is a timing chart illustrating a gear position control of a gear position control unit in idle reduction according to the fourth embodiment.

A hybrid vehicle 1C according to a fourth embodiment of the present invention will be described with reference to FIGS. 10 to 12. A structure of the hybrid vehicle 1C may be common to any one of the hybrid vehicles 1, 1A, and 1B and will be described by using the reference numerals (for example, the hybrid ECU 18C, the idle reduction control unit 30C, and the like) of the same system. FIG. 10 is a block diagram illustrating a configuration of a function implemented in the hybrid ECU 18C (not illustrated in the drawings).

When the hybrid ECU 18C executes a program, an idle reduction control unit 30C and an idle reduction gear position control unit 31 are implemented in the hybrid ECU 18C as illustrated in FIG. 10. The idle reduction gear position control unit 31 serves to control the gear position according to the idle reduction control.

The idle reduction control unit 30C and the idle reduction gear position control unit 31 of the hybrid vehicle 1C set the gear position to a start stage or a neutral stage according to brake liquid pressure within a predetermined vehicle speed range just before the idle reduction. The control is illustrated in FIG. 11. FIG. 11 is a relationship diagram illustrating the relationship among the vehicle speed, the brake liquid pressure, and the gear position and has the vehicle speed on a horizontal axis thereof and the brake liquid pressure on a vertical axis thereof. In FIG. 11, when the brake liquid pressure is c (kg/cm2) or more while the vehicle speed is a (km/h) or more and b (km/h) or less, the gear position is set to the neutral stage and when the brake liquid pressure is less than c (kg/cm2) while the vehicle speed is a (km/h) or more and b (km/h) or less, the gear position is set to the start stage.

In general, strengths at which the driver steps the brake pedal in deceleration at which the vehicle does not stop and deceleration to stop the vehicle are different from each other. Therefore, when the brake liquid pressure within a predetermined vehicle speed range during deceleration is a predetermined value or more, the idle reduction gear position control unit 31 determines that the driver performs the deceleration to stop the vehicle to set the gear position to the neutral stage and when the brake liquid pressure within the predetermined vehicle speed range during deceleration is less than a predetermined value, the idle reduction gear position control unit 31 determines that the driver performs the deceleration in which the vehicle does not stop to set the gear position to the start stage.

The above processing will be described in a flowchart of FIG. 12. The flowchart of FIG. 12 additionally includes processes of steps S40 to S43 to the flowchart of FIG. 3. Hereinafter, a description of the process which overlaps with the flowchart of FIG. 3 will be omitted.

Figure 12:
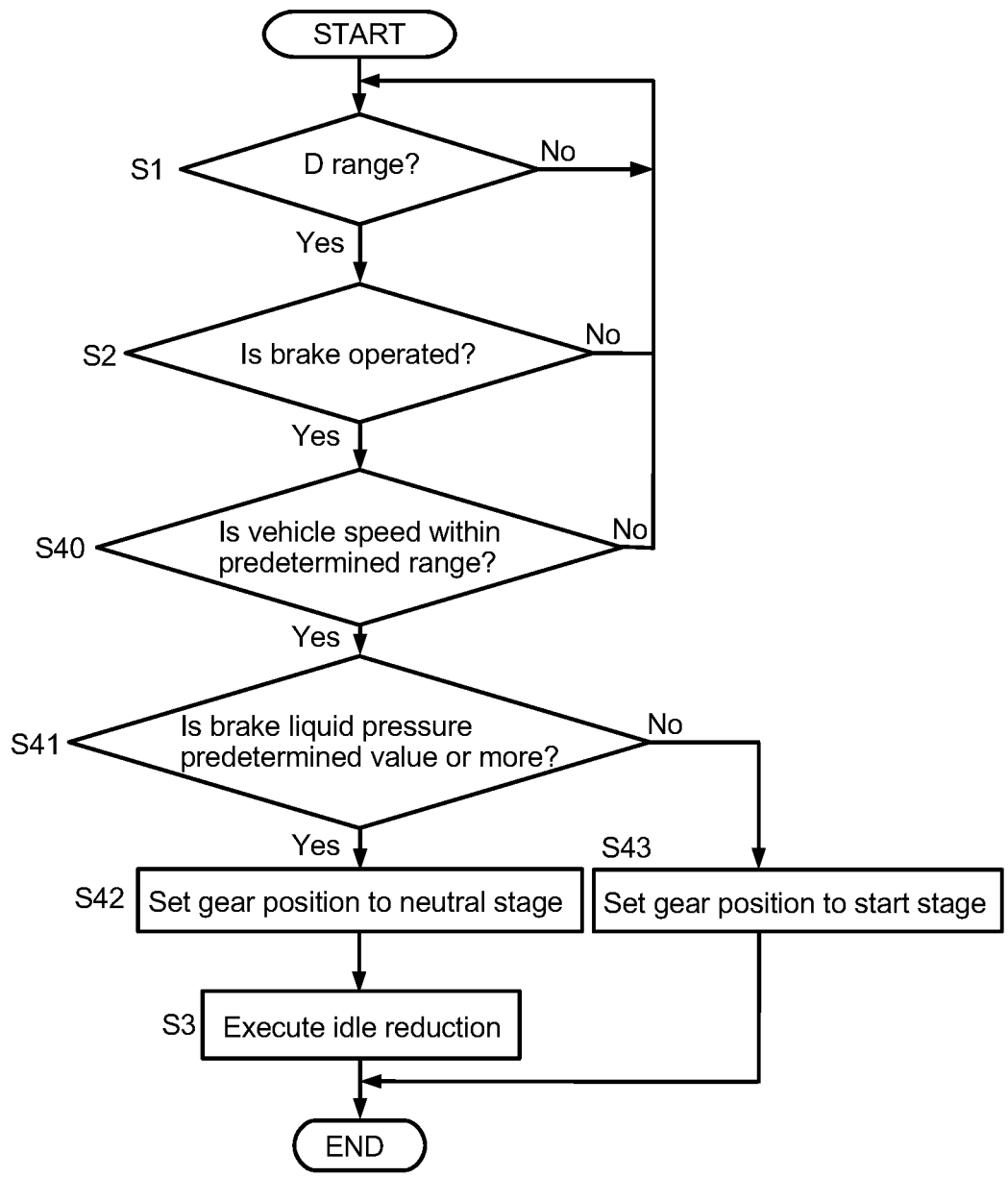
FIG. 12 is a flowchart illustrating idle reduction processing of an idle reduction control unit according to the fourth embodiment.

As illustrated in FIG. 12, the idle reduction control unit 30C determines whether the brake is operated in step S2. In step S2, when it is determined that the brake is operated, the process proceeds to step S40. On the other hand, in step S2, when it is determined that the brake is not operated, the process returns to step S1.

In step S40, the idle reduction gear position control unit 31 determines whether the vehicle speed of the hybrid vehicle 1C is within a predetermined range. In step S40, when it is determined that the vehicle speed of the hybrid vehicle 1C is within the predetermined range, the process proceeds to step S41. On the other hand, in step S40, when it is determined that the vehicle speed of the hybrid vehicle 1C is not within the predetermined range, the process returns to step S1.

In step S41, the idle reduction gear position control unit 31 determines whether the brake liquid pressure is a predetermined value or more. In step S41, when it is determined that the brake liquid pressure is the predetermined value or more, the process proceeds to step S42. On the other hand, in step S41, when it is determined that the brake liquid pressure is less than the predetermined value, the process proceeds to step S43.

In step S42, the idle reduction gear position control section 31 sets the gear position to the neutral stage, and as a result, the process proceeds to step S3.

In step S43, the idle reduction gear position control unit 31 sets the gear position to the start stage, and as a result, the process proceeds to step S3.

(In Regard to Effects)

In the conventional art, the control is performed so that the gear position is in the start stage during deceleration. When the vehicle stops in this state, an idle reduction control process is started from when the vehicle stops. In the idle reduction control process, the gear position is set to the neutral stage from the start stage, the clutch 12 is connected by substantially synchronizing the rotational speed of the electric motor 13 with the rotational speed of the engine 10, and the engine 10 is stopped by the friction of the electric motor 13 by allowing the electric motor 13 to generated electricity for stopping the engine.

On the contrary, according to the hybrid vehicle 1C, the gear position may be set to the start stage or the neutral stage according to the brake liquid pressure within the predetermined vehicle speed range during deceleration. As a result, in case of the deceleration to stop the vehicle, the gear position may be set to the neutral stage in advance. Accordingly, the process of setting the gear position to the neutral stage from the start stage in the idle reduction control process after the hybrid vehicle 1C stops may be omitted. As a result, the idle reduction control process may be shortened as compared with the conventional art. Therefore, exhaust gas of the hybrid vehicle 1C may be reduced and fuel efficiency of the hybrid vehicle 1C may be improved.

As a modified example thereof, in the hybrid vehicle 1C, when the deceleration is determined to be for stopping the vehicle and the gear position is set to the neutral stage in advance, the idle reduction control process may be started prior to the stop without waiting until the vehicle completely stops thereafter. By this configuration, the hybrid vehicle 1C may be already in the no idling state at the time when the hybrid vehicle 1C stops, and effects of reduction in the exhaust gas and improvement of the fuel efficiency may be increased.

Fifth Embodiment

A hybrid vehicle 1D according to a fifth embodiment of the present invention will be described with reference to FIGS. 13 to 16. A structure of the hybrid vehicle 1D may be common to any one of the hybrid vehicles 1, 1A, and 1B and will be described by using the reference numerals (for example, the hybrid ECU 18D, the idle reduction control unit 30D, and the like) of the same system.

Figure 13:
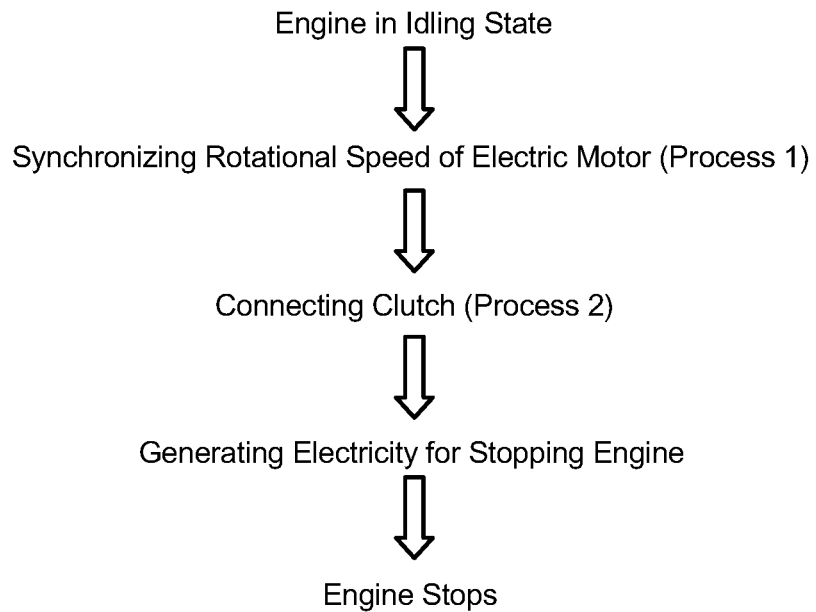
FIG. 13 is diagram describing a process of controlling idle reduction in the conventional art.

FIG. 13 is a diagram illustrating an engine stop process during idle reduction in the conventional art. In the conventional art, as illustrated in FIG. 13, the idle reduction is performed by three steps of processes 1 to 3: an engine being in an idling state→synchronizing the rotational speed of the electric motor (process 1)→connecting the clutch (process 2)→generating electricity for stopping the engine (process 3)→the engine stops.

Figure 14:
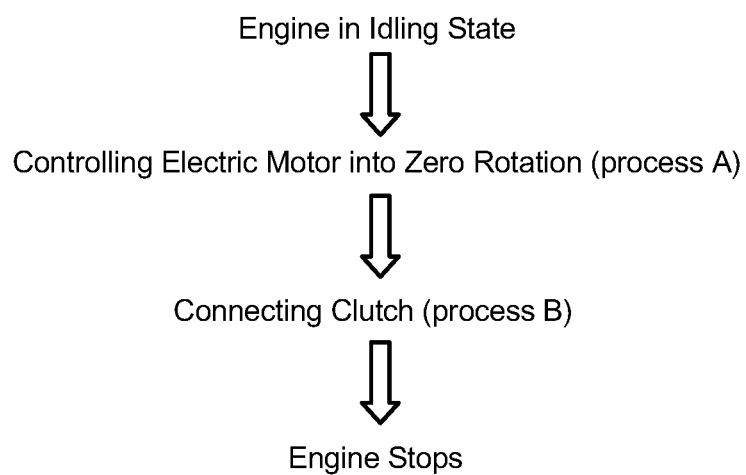
FIG. 14 is a diagram describing a process of controlling idle reduction according to a fifth embodiment.

On the contrary, the idle reduction control unit 30D of the hybrid vehicle 1D performs the idle reduction by two steps of processes A and B: an engine being in an idling state→controlling the electric motor into zero rotation (process A)→connecting the clutch (process B)→the engine stops, as illustrated in FIG. 14. Herein, in the controlling of the electric motor into zero rotation, torque of the electric motor 13 is controlled in a direction to alleviate external force when the external force to rotate a rotational shaft is applied to the rotational shaft (rotor) of the electric motor 13.

(In Regard to Effects)

Figure 15:
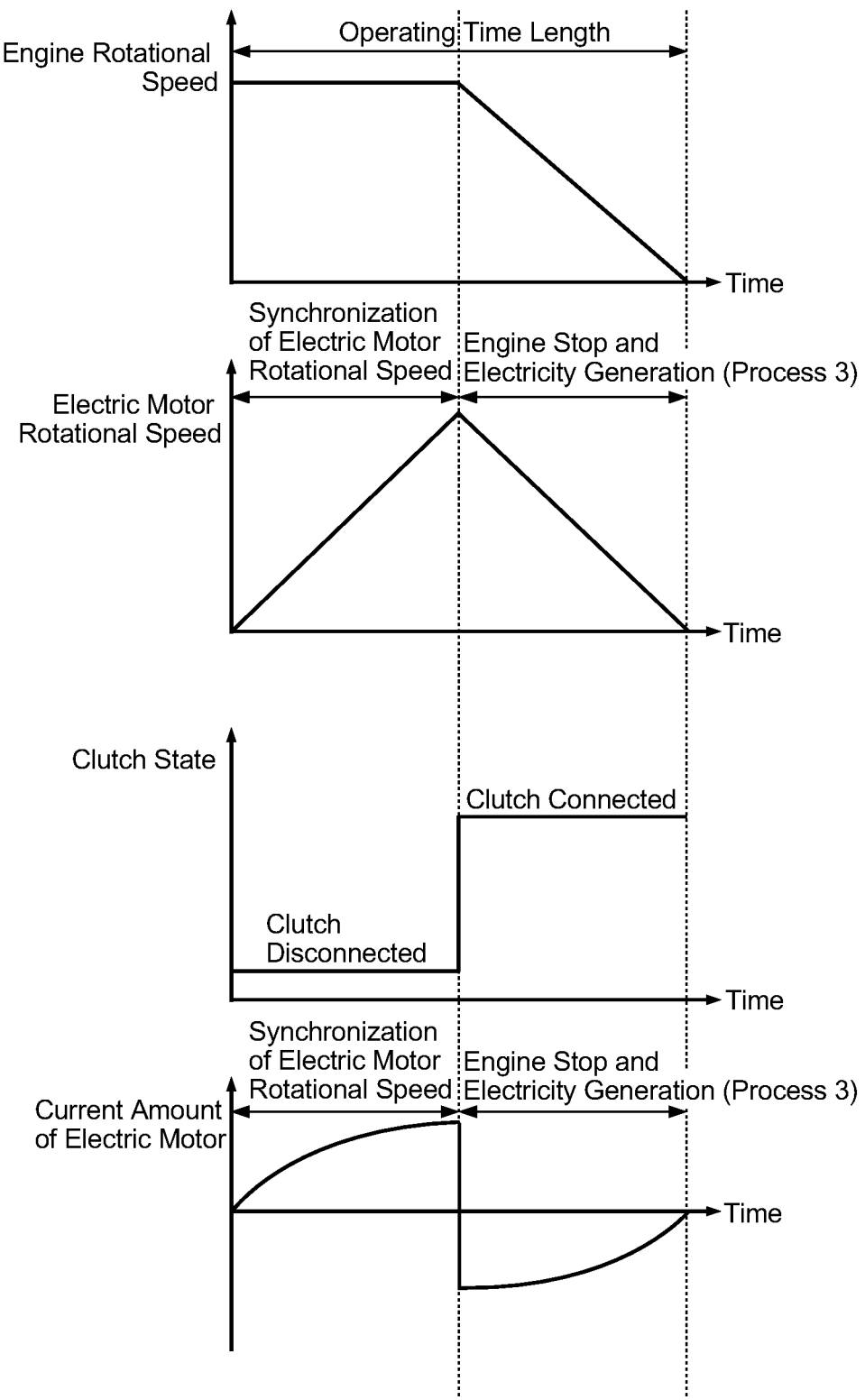
FIG. 15 is a diagram illustrating a rotational speed of an engine, a rotational speed of an electric motor, a clutch state, and a current amount of the electric motor with a time elapsed in the process of controlling idle reduction in the conventional art.

FIG. 15 is a diagram illustrating the rotational speed of the engine (top stage), the rotational speed of the electric motor (second stage from the top), a state of the clutch (third stage from the top), and a current amount of the electric motor (bottom stage) with a time elapsed in the idle reduction control in the conventional art. On the other hand, FIG. 16 is a diagram illustrating the rotational speed of the engine (top stage), the rotational speed of the electric motor (second stage from the top), the state of the clutch (third stage from the top), and the current amount of the electric motor (bottom stage) with a time elapsed in the idle reduction control unit 30D of the hybrid vehicle 1D.

Figure 16:
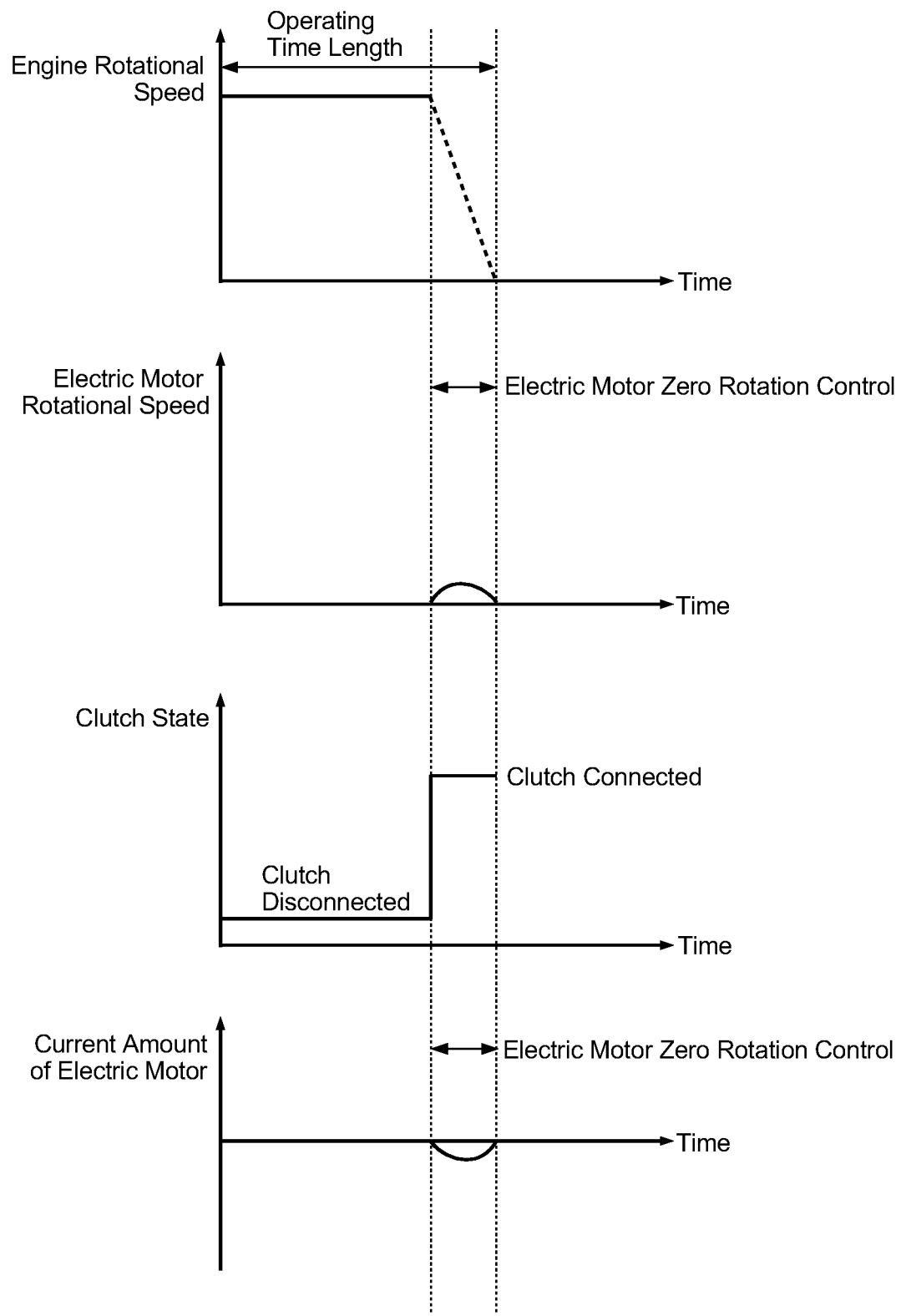
FIG. 16 is a diagram illustrating a rotational speed of an engine, a rotational speed of an electric motor, a clutch state, and a current amount of the electric motor with a time elapsed in the process of controlling idle reduction according to the fifth embodiment.

When a change in rotational speed of the engine illustrated in FIG. 15 and a change in rotational speed of the engine illustrated in FIG. 16 are compared with each other, it can be seen that the rotational speed of the engine illustrated in FIG. 16 becomes zero rotation within a shorter time than the rotational speed of the engine illustrated in FIG. 15.

When a change in rotational speed of the electric motor illustrated in FIG. 15 and a change in rotational speed of the electric motor illustrated in FIG. 16 are compared with each other, it can be seen that the electric motor 13 rotates within an extremely short time in controlling zero rotation of the electric motor in FIG. 16, while the electric motor 13 rotates in the process of synchronization of the rotational speeds of the electric motors and the process of engine stop and generation in FIG. 15.

When the state of the clutch illustrated in FIG. 15 and the state of the clutch illustrated in FIG. 16 are compared with each other, it can be seen that a process is terminated just after the clutch connection in FIG. 16, while the process is continued for a while after the clutch connection in FIG. 15.

When the current amount of the electric motor illustrated in FIG. 15 and the current amount of the electric motor illustrated in FIG. 16 are compared with each other, it can be seen that current continuously flows in the process of synchronization of the rotational speeds of the electric motors and the process of engine stop and generation in FIG. 15, while a little current flows only for a short time of controlling the zero rotation of the electric motor in FIG. 16.

As a result, in the hybrid vehicle 1D, the idle reduction process may be terminated within a shorter time than the conventional art, and effects of reduction in the exhaust gas and improvement of the fuel efficiency may be increased. As a result, a current amount consumed in the idle reduction process may be remarkably reduced.

Other Embodiments

In the aforementioned description of the flowcharts, boundaries of determination regions may be variously changed, such as setting 'or more' to 'over' and 'less than' to 'or less'.

The engine 10 has been described as the internal combustion engine, but may be a heat engine including an external-combustion engine.

It has been described that the programs executed by the hybrid ECUs 18, 18A, 18B, 18C, and 18D are installed in the hybrid ECUs 18, 18A, 18B, 18C, and 18D in advance, but removable media (storing the programs) in which the program are stored are mounted on a drive (not illustrated in the drawings), and the like and the programs read from the removable media are stored in non-volatile memories in the hybrid ECUs 18, 18A, 18B, 18C, and 18D or programs transmitted through wired or wireless transmission media are received by a communication unit (not illustrated in the drawings) and stored in the non-volatile memory in the hybrid ECUs 18, 18A, 18B, 18C, and 18D to be installed in the hybrid ECUs 18, 18A, 18B, 18C, and 18D which are the computers.

Each ECU may be implemented by an ECU acquired by arranging some or all of the functions as one or an ECU acquired by further segmenting the function of each ECU may be newly formed.

The programs executed by the computers may be programs which are processed in time series according to a sequence described in the specification or programs which are processed in parallel or at a required timing such as the time when calling is performed.

The embodiment of the present invention is not limited to the aforementioned embodiments and may be variously changed within a scope without departing from the gist of the present invention.

The invention claimed is:

1. An idle reduction control device in which an engine is set to a no idling state when a key switch is in an ON state, a brake is operated, thus a vehicle speed is zero and a shift position is in a drive range, and the engine is restarted when an operation of the brake is released while the engine is in the no idling state and the shift position is in the drive range,
   wherein the engine is restarted when the shift position is transferred from the drive range to a neutral range while the brake is still being operated when the engine is in the no idling state.

2. The idle reduction control device according to claim 1, wherein prior to executing idle reduction in a vehicle having a hill start assisting device holding braking force even though a driver releases the operation of the brake when stopping on an ascending slope, when the hill start assisting device is in an off state, the hill start assisting device is forcibly turned on.

3. A vehicle having an idle reduction control device according to claim 1, wherein
   the idle reduction control device is started with the start of the vehicle, and
   the vehicle has a switch that alternately repeats pause and restart of the idle reduction control device whenever the switch is operated.

4. The vehicle according to claim 3, wherein, when the brake is operated at a strength of a predetermined value or more, a gear position is set to a neutral stage and provided in the idle reduction and when the brake is operated at a strength less than a predetermined value, the gear position is set to a start stage.

5. The vehicle of claim 3, wherein, when an engine is set to the idle reduction, a rotational shaft of the engine is connected to a rotational shaft of an electric motor controlled to hold zero rotation.

6. The vehicle according to claim 3, further comprising an engine and an electric motor,
   wherein a hybrid vehicle is driven by an engine or an electric motor, or cooperation of the engine and the electric motor.

7. An idle reduction control method for an idle reduction control device in which an engine is set to a no idling state when a key switch is in an ON state, a brake is operated, thus a vehicle speed is zero and a shift position is in a drive range, and the engine is restarted when an operation of the brake is released while the engine is in the no idling state and the shift position is in the drive range, wherein the engine is restarted when the shift position is transferred from the drive range to a neutral range while the brake is still being operated when the engine is in the no idling state.

8. A computer program for causing an information processing device to execute a function of an idle reduction control device according to claim 1.

* * * * *